Sept. 8, 1964

J. D. WEIR 3,147,622

FORCE BALANCE INDICATING DEVICE

Filed March 9, 1961

INVENTOR.
JOHN D. WEIR
BY
ATTORNEY

Sept. 8, 1964   J. D. WEIR   3,147,622
FORCE BALANCE INDICATING DEVICE
Filed March 9, 1961   2 Sheets-Sheet 2
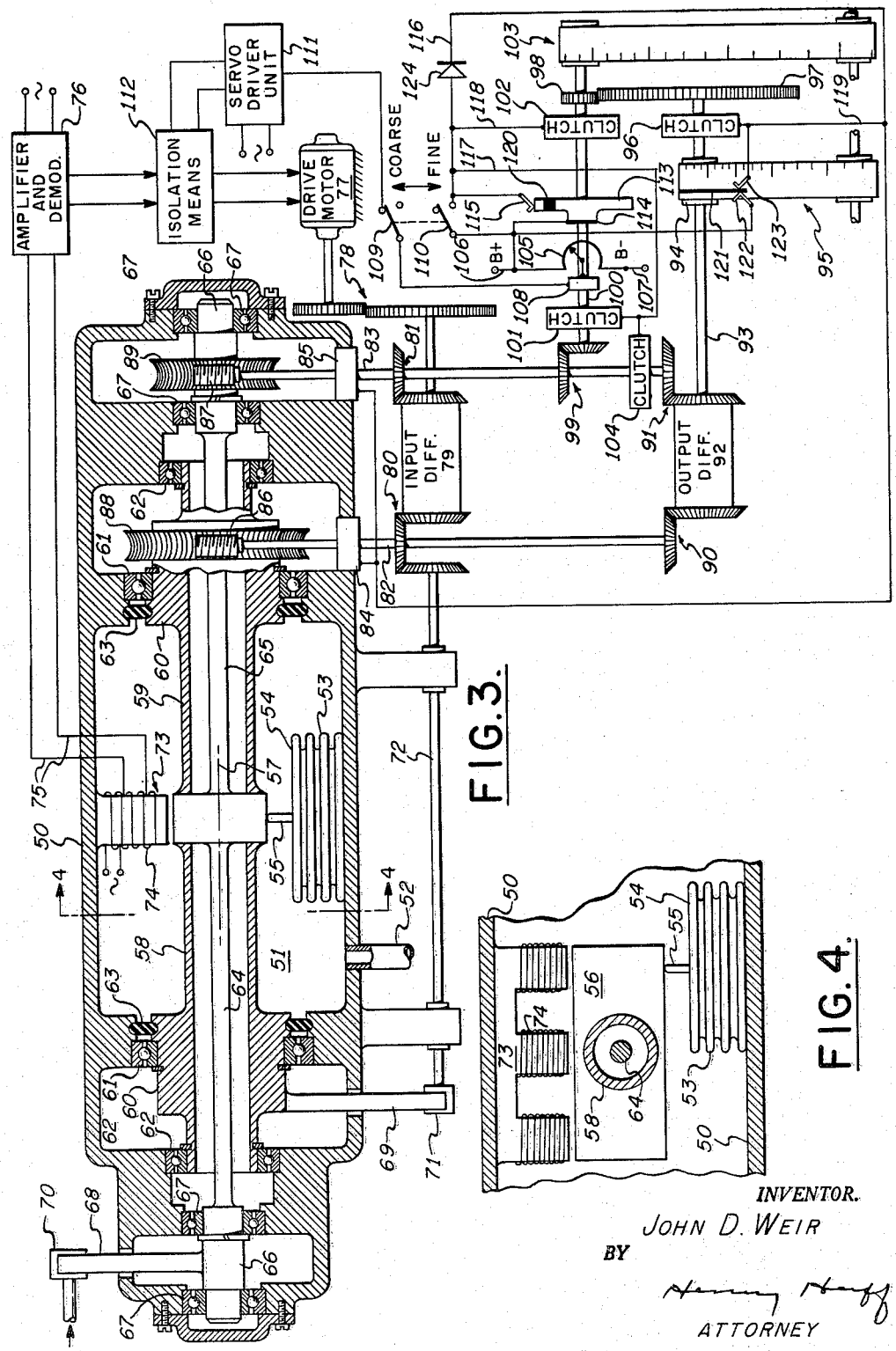
INVENTOR.
JOHN D. WEIR
BY
ATTORNEY ३,१४७,६२२
FORCE BALANCE INDICATING DEVICE
John D. Weir, Huntington, N.Y., assignor to Sperry Rand Corporation, Great Neck, N.Y., a corporation of Delaware
Filed Mar. 9, 1961, Ser. No. 94,538
7 Claims. (Cl. 73—398)

This invention relates to measuring instruments of the force balance type.

These instruments are known for their high degree of accuracy and linearity and for their relative simplicity and compactness. Such features make these instruments well suited to a variety of applications as for example, in the measurement of temperature, pressure, density, flow and acceleration.

In many cases the measurements must be made over a great range. Also it is often desirable that high resolution or expanded scale readings be available at various levels over the range of the instrument. In barometric type altimeters for example, very fine pressure readings are desired at low altitudes for purposes of landing; while at altitudes exceeding 100,000 feet, fine readings again should be available to indicate the minute variations in pressure found at that level. Extended range and high resolution however, are generally considered to be inconsistent parameters and have been simultaneously improved only with a corresponding increase in complexity or decrease in accuracy.

A further requirement of such instruments is that they be easily and accurately corrected with a minimum of complexity. In the past, corrections have been applied to the output indicator of the instrument. However, such techniques limit the number of corrections which may be made. Furthermore the amplified effects of errors in the corrections themselves as well as those errors which accompany the insertion of these corrections into the system very often offset much of the gain in accuracy which they produce.

Consequently it is an object of this invention to expand the capabilities of force balance type instruments.

It is another object to provide an extended range high resolution force balance type instrument.

A further object is to permit a greater number of corrections to be applied to such instruments.

A still further object is to improve the accuracy of such instruments with a minimum of complexity.

These and other objects will become more apparent as the various embodiments of the invention are described.

The invention attains its objects in the following manner. A force balance system is provided with a detector which develops a proportional force on a displaceable control link in response to a detected input quantity. A number of independently actuated force developing means are individually applied to the control link. These means exert various forces and counter-forces on the link to maintain it in an equilibrium or null position. Certain of these force developing means are actuated in response to various external conditions and provide corrections to the indicator. The remaining means develop balancing forces at various levels of magnitude and are selectively actuated in response to displacements of the control link from the null position. The amount by which these remaining means are actuated indicates the magnitude of the detected input quantity. Large or small variations in the detected input quantity are indicated by selectively actuating either the less or more sensitive of the remaining force producing means in response to displacements of the control link.

Referring now to the figures:

FIG. 3 is a section view of a preferred embodiment of the invention; and

FIG. 4 is a view taken along line 4—4 of FIG. 3.

Figure 1:
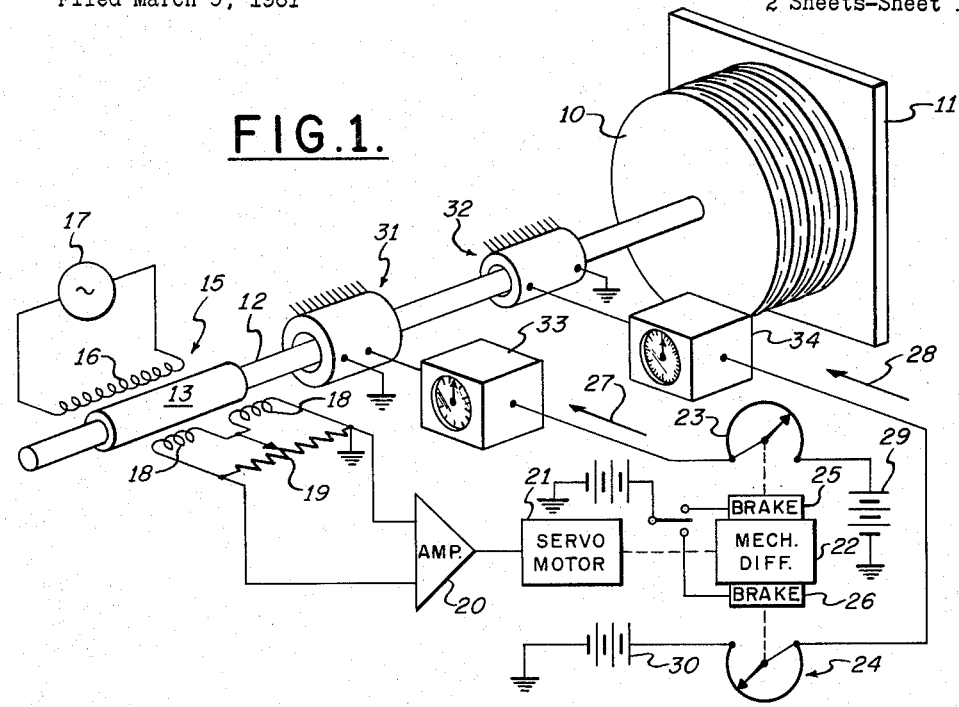
FIG. 1 is a schematic diagram for demonstrating one feature of the present invention.

FIG. 1 illustrates an application of the principles of the present invention to a fine-coarse instrument system such as a pressure sensor. The device as shown includes a pressure sensitive element 10, in the form of an aneroid bellows. The bellows is attached at one end to a fixed plate 11, and at the other end to a control link or shaft 12. The control link moves axially with expansions and contractions of the bellows caused by variations in ambient pressure. The control link 12 includes a section 13 which forms the iron core of a differential transformer 15. The differential transformer comprises a primary coil 16 excited from a source of alternating voltage 17 and a double winding secondary 18 which is center tapped to a resistor 19. The outer coils of the secondary windings are connected across the resistor. Axial displacements of the iron core caused by expansion or contraction of the bellows result in variations in phase and amplitude of the voltage at the output of the transformer. This voltage is applied to a servo amplifier 20 which drives a servo motor 21. The servo motor is connected through a mechanical differential 22 to the wiper arms of two potentiometers as designated respectively 23 and 24. Electrically operated brakes 25 and 26 are provided on each of the output shafts of the differential 22 and may be locked alternately as shown, thus switching the servo motor output to one or the other of the potentiometers. The potentiometers 23 and 24 serve as control elements in coarse and fine balancing channels designated as 27 and 28 respectively. Each channel comprises a potentiometer serially connected between a voltage source (29 and 30) and a solenoid (31 and 32). The solenoids as shown are situated in tandem along the control link 12, although they may be positioned coaxially with each other about the link. The coarse channel solenoid 31 contains a relatively large number of turns and produces a wide variation in axial magnetic force upon the control link as its respective potentiometer 23 is adjusted. The fine channel solenoid 32 contains relatively few turns and produces much smaller forces as its potentiometer 24 is adjusted. Ammeters 33 and 34 are provided in series with each of the solenoids. Since the magnetic force developed by the solenoids is proportional to the current flowing through their respective windings, the ammeters may be calibrated to give pressure indications directly.

The device operates in the following manner: Variations in ambient pressure cause expansion or contraction of the bellows and corresponding axial movements of the control link 12. These movements are detected by the differential transformer 15 which supplies error signals to the servo amplifier 20 to drive the servo motor 21. Coarse indications are obtained by locking the fine channel brake 26. The servo motor then drives the coarse channel potentiometer 23 which changes the current through the coarse channel solenoid 31 until it produces a balancing force on the control link sufficient to return the transformer core 13 to its null position. The amount of force required to balance the system is proportional to the ambient pressure on the bellows 10. It is also proportional to the current through the solenoid which is indicated by the coarse channel ammeter 33. Fine indications may be obtained anywhere over the total range of the system by merely locking the coarse channel brake 25 and unlocking the fine channel brake 26. During this mode of operation the coarse channel solenoid 31 will continue to exert a constant force upon the control link. Further changes in pressure will cause the servo motor to drive the fine channel potentiometer 24 which controls current to the fine channel solenoid 32. Because of the fewer number of turns in this solenoid a greater amount of current is necessary to produce corresponding balancing forces. Thus the fine channel ammeter 34 may be calibrated to give a higher resolution.

Figure 2:
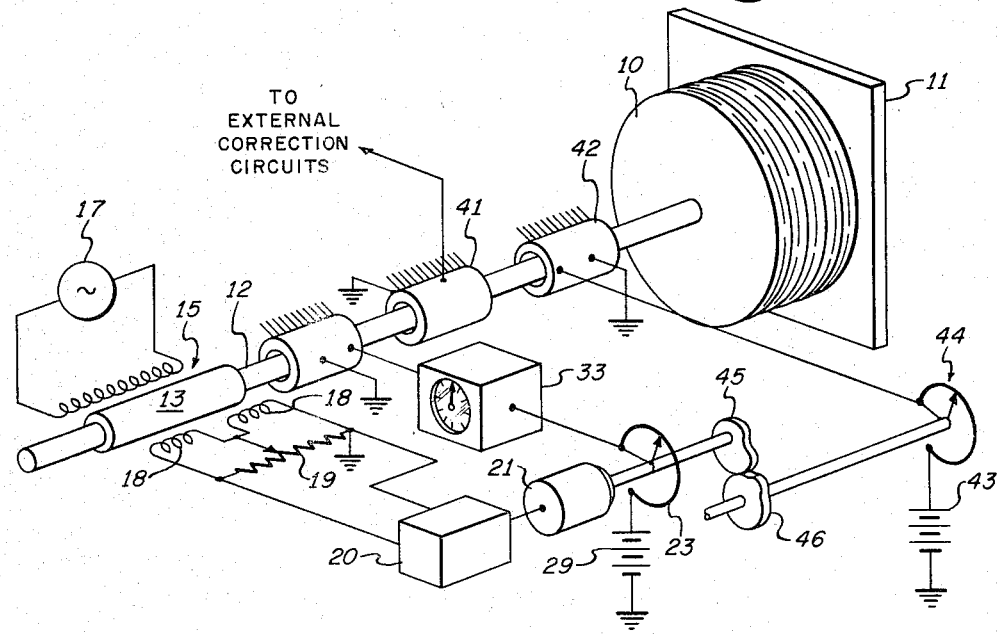
FIG. 2 is a schematic diagram for demonstrating a second feature of the invention.

FIG. 2 illustrates a further application of the principles of the invention. This embodiment provides a variety of corrections to the system through the addition of several independently controlled force producing means shown as solenoids 41 and 42. The system is structurally similar to that shown in FIG. 1 with respect to the bellows 10, the control link 12, the transformer 15 and the servo amplifier 20 and motor 21. For purposes of explanation however, only one balancing channel is shown, although any number may be provided in the manner previously described. Additional solenoids 41 and 42 are shown in FIGURE 2. These provide various corrections to the system by adding to or subtracting from the forces produced by the bellows 10 on the control link. This changes the amount by which the balancing channel must be actuated and thus changes the output indications. The external solenoid 41 is controlled by external conditions which may affect the accuracy of the pressure reading. These variables are measured by various instruments (not shown). Their effect on pressure is computed and a proper current is developed and supplied to the external correction solenoid 41. The internal correction solenoid 42 is supplied from a voltage source 43, with a current controlled by means of a potentiometer 44 which in turn is driven through correction cams 45 and 46 from the servo motor 21. The correction cams are designed to compensate for errors inherent in the bellows 10, the differential transformer 15 and various other portions of the instrument itself. The exact shape of the cams is determined by calibrating the instrument with an accurate standard. It is to be noted that the correction forces provided in this manner are equal only to the errors inherent in the system and are not affected by the magnitude of the pressure being sensed. A further advantage of this arrangement results from the fact that any errors inherent in the correction cam itself will affect the overall output indications by a reduced amount.

Referring now to FIGS. 3 and 4, another embodiment of the invention is shown in the form of an aircraft altimeter. The device includes a casing 50 in which is formed a sealed enclosure 51. An inlet port 52 communicates the enclosure with a source of static pressure to be measured which, in the present case, is the atmosphere. The enclosure is sealed so that the outside static pressure which is incident upon the bellows 53 will be relatively unaffected by turbulence and related conditions at high speeds. The evacuated bellows 53 is located within the enclosure 51. The bottom of the bellows is fastened to the floor of the enclosure 51 while its top 54 is allowed to move vertically with variations in static pressure. The movable top of the bellows is connected by means of a coupling wire 55 to a rotatable control link 56 also located within the enclosure. The control link is constrained to rotation about an axis 57 by means of outer tubular torsion bars 58 and 59 extending from either side of the link 56 and lying along the axis 57. Each of the outer tubular torsion bars terminates in a hub 60 which is axially fixed within the outer casing 50 by means of bearings 61 and 62. O ring type seals 63 are connected between each hub and the casing to prevent leakage to or from the static pressure enclosure 51. Two inner torsion bars 64 and 65 are located coaxially within the outer torsion bars and are also connected to the control link. The inner torsion bars extend beyond the outer tubular torsion bars and terminate in hubs 66 which are axially fixed within the outer casing 50 by means of bearings 67. It is to be noted that no seal is necessary in the case of the inner torsion bars since they do not communicate with the enclosure 51.

Rigid cam follower arms 68 and 69 extend from each of the torsion bar hubs 66 and 60 on one side of the control link 56 and ride on external and internal correction cams 70 and 71 respectively. The external correction cam 70 is controlled by any one of several external variables which affect the static pressure source. These variables usually include such conditions as temperature, angle of attack and Mach number. The magnitudes of these quantities and their relative effects on pressure are obtained by means of various instruments (not shown). The outputs of these instruments control the rotation of the external correction cam 70. This operation may be performed, for example in a manner similar to the temperature compensation provided in Patent 2,358,803 which is assigned to the assignee of the present invention. It is to be noted that the means for establishing the relative effects of each of the external variables may be incorporated into the system itself merely by increasing the number of concentrically mounted torsion bars, carefully selecting their respective spring constants and applying the various detected quantities to the cams and followers on each torsion bar. The internal correction cam 71 provides corrections to the control link 56 by means of the outer torsion bar 58. The cam is rotated by means of a feedback shaft 72 which is driven in response to the magnitude of the coarse pressure being measured. This cam provides corrective forces to compensate for inherent errors in the device itself such as non-linearities in spring rates and bellows characteristics.

An E type magnetic pick-off 73 is located on the upper wall of the enclosure with its pick-off arms located slightly above the control link 56. An alternating reference voltage from an external source (not shown) is supplied to a coil 74 on the middle arm of the magnetic pick-off. The output from the pick-off is supplied via wires 75 to amplifier and demodulator circuits designated as 76. The amplifier and demodulator circuits provide drive voltages to a servo motor 77. The motor drives through a gear train 78 to an input differential 79 attached to the outer casing 50. The output of the differential is fed via bevel gear systems 80 and 81 to coarse and fine output shafts 82 and 83. The output shafts run through electrically actuated brake mechanisms 84 and 85 located in the outer casing 50. Locking either brake causes the differential 79 to drive the other shaft. Each of the output shafts contains a worm gear, 86 and 87, which is in mesh with a sector of a worm wheel, 88 and 89, connected to the hub of the outer and inner torsion bars on one side of the control link 56. The fine output shaft brake 85 is normally locked while the coarse output shaft brake 84 is normally unlocked. The condition of the brakes may be reversed by applying a positive voltage to both of them.

The coarse and fine output shafts extend downward from the input differential and terminate in further bevel gears 90 and 91 which are connected respectively to the sun and ring gears of an output differential 92. The carrier or output shaft of the output differential, designated as 93, is connected to the drive spool 94 of a tape presentation type indicator 95, known as the coarse indicator. The output shaft 93 extends beyond the coarse indicator and through a first electrically operated clutch 96 to a pair of step-up spur gears 97 and 98. The fine output shaft 83 is further connected by means of bevel gears 99, a shaft 100, and second and third electrically operated clutches 101 and 102, to a further tape presentation type indicator 103, known as the fine indicator. The driven spur gear 98 is connected to the fine indicator shaft 100 between the third clutch 102 and the fine indicator 103. A fourth electrically operated clutch 104 is located on the fine output shaft 83 intermediate the fine and coarse output bevel gear systems 99 and 91. The clutches 101 and 102 on the fine indicator shaft 100 are normally disengaged and may be engaged by the application of a positive voltage. The other clutches 96 and 104 are normally engaged and may be disengaged by the application of a positive voltage.

A potentiometer 105 is connected between positive and negative voltage sources 106 and 107. The wiper arm of the potentiometer is fixed to the fine indicator shaft 100 between the clutches 101 and 102 electrically connected by means of a first ring and brush arrangement 108 to a terminal of the first of a pair of ganged single-pole-single-throw switches 109 and 110. The switching element of the first switch 109 is connected to a servo driver circuit 111 which generates voltages for the drive motor 77. When the switches are thrown to the coarse mode of operation these voltages are supplied to the motor via an isolation means 112. When the switches are thrown to the fine mode of operation, the second switch 110 connects the positive voltage source 106 to all the clutches and brakes via leads 116, 117, 118 and 119. An electrically conductive ring 113 is also fixed to the fine indicator shaft 100 between the clutches 101 and 102 and is supplied with a potential from the positive voltage source 106 by means of a second ring and brush arrangement 114. A further brush 115 rides on the ring 113 to maintain the positive voltage from the source 106 on the clutches and brakes even when the second switch 110 is disconnected. The conductive ring 113 is broken in one area 120 so that no voltage appears on the brush at a position corresponding to a zero indication on the fine indicator 103.

The tapes of the two indicators are graduated in essentially logarithmic manner. This provides a convenient conversion from the indicator shaft rotation (which is linear with respect to pressure), to altitude indication (which is substantially logarithmic with respect to pressure). The fine indicator tape has the same readings in the same relative distribution as the coarse indicator tape, but is expanded to give a finer reading. The ratio of the spur gears 97 and 98 is equal to that of the tape lengths. Thus as the coarse indicator is driven, equal indications will be presented by both tapes. In this mode however the fine indicator tape moves too rapidly for convenient reading thus necessitating the use of the coarse indicator tape.

The coarse indicator tape has an electrically conductive strip 121 along one side in the region which indicates above 75,000 feet. When this altitude is exceeded the conductive strip moves between a pair of brushes 122 and 123. These brushes are connected respectively to the positive voltage source 106 and to the lead 116 to the coarse and fine brakes 84 and 85. A diode 124 is located in the lead 116 between the connection to the brushes and the connection to the second, third and fourth clutches 101, 102 and 104. With this arrangement, the tape controlled voltage actuates only the brakes 84 and 85 and the first clutch 96.

The device operates in a manner similar to that of the preceding embodiments. The present embodiment however utilizes torsion bars in place of solenoids as the force producing means and also incorporates the features of both preceding embodiments into a single device. Furthermore the present embodiment utilizes the principles of the invention in such a manner that range capability is nearly doubled while resolution is increased.

As the aircraft changes altitude the corresponding pressure variations tend to expand or contract the bellows 53. The bellows movements are communicated to the control link 56 causing it to tilt about its axis 57 and twisting the various torsion bars. The tilt of the control link is detected by the magnetic pick-off 73 which sends a signal of corresponding phase and amplitude to the amplifier and demodulator circuits 76. A signal is then applied to the drive motor 77 which drives through the input differential 79 to the output shafts 82 and 83. With no signal applied to the output shaft brakes, the coarse brake 84 alone is unlocked and the motor will drive the coarse output shaft 82 exclusively. The shaft operates through its worm gear 86 and 88 to turn the outer torsion bar 59. This turning of the torsion bar continues until the control link 56 is restored to its horizontal position, which eliminates further signals to the drive motor 77. Also the amount by which the torsion bar has twisted is now seen as the amount by which its outer end has turned. Since the amount by which a torsion bar is twisted is proportional to the amount of torque it is exerting, and since this torque exactly balances that caused by the bellows, the twist of the torsion bar is a function of the pressure being measured.

A fine output reading may be obtained by locking the coarse output shaft brake 84 and unlocking the fine output shaft brake 85. The motor then drives the fine output shaft 83 which turns the inner torsion bar 65. Since the inner torsion bar must twist greater amounts to produce corresponding balancing torques on the control link, a higher output resolution is obtained. Because of the isolation afforded by the worm gearing and the brakes, the coarse torsion bar will not untwist while the system is being operated in the fine or high resolution mode. Thus it is possible to obtain fine readings anywhere over the range of the coarse torsion bar.

At altitudes exceeding approximately 75,000 feet the inner or fine torsion bar 65 is used exclusively. Pressure variations at these altitudes are so slight that accurate indications could not be made with the relatively stiff outer torsion bar 59. The inner torsion bar however is capable of indicating these variations with high accuracy.

When the device is operated in conjunction with an air data system, external instruments measure the various conditions which affect pressure indications. The amount by which these conditions influence pressure is obtained through computation and applied as a shaft rotation of the external correction cam 70 which operates through its cam follower 68 to the inner torsion bar 64 on the other side of the control link. Thus the pressure indicated by the device is not actual pressure but rather that which would exist at standard atmospheric conditions. This permits a more accurate and more easily applied pressure to altitude conversion at the indicator portion of the device. Rotation of the coarse output shaft 82 is communicated to the feedback shaft via the bevel gear 80 and causes the internal correction cam to rotate accordingly. This provides corrections for errors which are peculiar to the individual device. It is to be noted that feedback corrections could also be provided in a similar manner from the fine output shaft 83. However, it has been found that the increase in accuracy obtainable would not warrant the accompanying increase in complexity.

Operation of the indicator portion of the device may be more readily understood after a prior discussion of the pertinent problems involved. These problems accrue from the fact that atmospheric pressure varies in approximately logarithmic fashion with respect to altitude and from the fact that the device is a fine-coarse system. Because of these factors non linear devices such as the tape arrangements must be provided, in order to convert pressure indications to altitude indications. Furthermore, because of the fact that the fine readings are to be available everywhere over the range of the device, it is necessary to provide some means whereby the coarse indicator portion may continuously adjust the tape setting of the fine indicator portion. Finally a means must be provided for switching the rotation of the fine output shaft into the coarse output indicator when the aircraft reaches an altitude of approximately 75,000 feet.

Operation will first be considered with the ganged switches 109 and 110 set in the "coarse" position. In this position no voltage is applied to any of the brakes or clutches which are all in their normal states as indicated. The drive motor 77 now turns the coarse output shaft 82 which in turn drives through the output differential 92 to the coarse indicator 95. During this mode the output differential also drives through the step-up spur gears 97 and 98 to the fine indicator 103. This continual adjustment of the fine indicator scale position insures accurate readings wherever the system is switched to the fine mode of operation.

Operation in the coarse mode continues until the aircraft reaches an altitude of approximately 75,000 feet at which time the conductive segment 121 in the coarse indicator tape moves between the brushes 121 and 122 on either side of the tape. This permits the voltage from the positive source 106 to be applied to the two brakes, 84 and 85, causing them to change their respective states. The drive motor now turns the fine output shaft 83 which in turn drives through the output differential 92 to the coarse indicator. When the aircraft returns to an altitude less than 75,000 feet the positive voltage applied to the brakes is interrupted by the first coarse output cam 95 and the system reverts to its original mode of operation.

At any altitude below 75,000 feet high resolution indications may be obtained by switching the ganged switches 113 and 114 to their "fine" position. This causes a positive voltage to be impressed upon each of the brakes as well as to each of the four clutches. In this condition the drive motor turns the fine output shaft 83. Since the clutch 104 on this shaft is now open, the shaft will not drive through the output differential 92 but rather will drive through the fine indicator shaft 100 to the fine indicator 106.

When the device is switched back to its coarse mode of operation, the voltage from the positive source is cut off. However, if a finite reading exists on the fine output indicator, when the system is switched to coarse operation, a positive voltage from the conductive ring 113 on the fine indicator shaft will maintain the brakes and clutches in their previous condition. Also a signal having a polarity and magnitude proportional to the fine indicating reading will be supplied from the protentiometer 105 to the servo driver unit 111 which in turn will generate signals causing the drive motor 77 to turn the fine output shaft until a zero reading is obtained on the fine indicator. When this occurs the break 120 in the brush 115 and the positive voltage to the clutches and brakes is interrupted, permitting them to revert to their normal states. The purpose for ensuring that the fine indicator is at its zero position before returning to operation in the coarse mode is to maintain proper synchronism between the setting of the fine and coarse indicator tapes.

While the invention has been described in its preferred embodiments, it is to be understood that the words which have been used are words of description rather than limitation and changes within the purview of the appended claims may be made without departing from the true scope and spirit of the invention in its broader aspects.

What is claimed is:

1. An improved force balance type indicating instrument comprising a link constrained to movement in a given direction, a detector responsive to an input quantity for producing a proportional force upon said link in said given direction, a plurality of movable elements, means for independently effecting movements of said elements in response to various conditions including movements of said link, individual resilient means for converting the movements of said elements into proportional forces opposite to said given direction, each of said resilient means being individually connected to said link and having cooperative resilient characteristics for providing an extended range of accurate operation of said instrument, and means for indicating the extent of movement of the elements which are operated in response to movements of said link.

2. The instrument described in claim 1 wherein said link is restrained from movement in said given direction solely by said detector force and said resilient means.

3. The instrument described in claim 1 wherein each of said resilient means is unsupported between its respective movable element and said link.

4. The instrument described in claim 1 wherein said link is constrained to rotary motion only.

5. The instrument described in claim 4 wherein said resilient means include torsion bars lying along the axis of said rotary motion.

6. The instrument described in claim 5 wherein said torsion bars extend from either side of said link.

7. The instrument described in claim 4 wherein certain of said torsion bars are tubular and are arranged coaxially with other torsion bars.

References Cited in the file of this patent

UNITED STATES PATENTS

| | | |
|---|---|---|
| 2,680,012 | Bozoian | June 1, 1954 |
| 2,688,477 | Lindars | Sept. 7, 1954 |
| 2,780,101 | Kinkel | Feb. 5, 1957 |